United States Patent [19]

Buddenhagen

[11] 4,273,079
[45] Jun. 16, 1981

[54] AIR-COMPRESSING DIRECT INJECTION INTERNAL COMBUSTION ENGINE

[75] Inventor: Uwe Buddenhagen, Munich, Fed. Rep. of Germany

[73] Assignee: Maschinenfabrik Augsburg-Nürnberg Aktiengesellschaft, Nürnberg, Fed. Rep. of Germany

[21] Appl. No.: 82,942

[22] Filed: Oct. 9, 1979

Related U.S. Application Data

[63] Continuation of Ser. No. 823,136, Aug. 9, 1977, abandoned.

[30] Foreign Application Priority Data

Jul. 1, 1977 [DE] Fed. Rep. of Germany ....... 2635847

[51] Int. Cl.$^3$ ............................................. F02B 19/00
[52] U.S. Cl. ................................. 123/276; 123/262; 123/279
[58] Field of Search ............. 123/30 C, 30 D, 193 C, 123/193 CP, 193 H, 193 CH, 193 P, 32 B, 32 A, 32 C, 32 D, 32 ST

[56] References Cited

U.S. PATENT DOCUMENTS

| | | | |
|---|---|---|---|
| 2,031,395 | 2/1936 | Vincent | 123/30.2 |
| 2,762,348 | 9/1956 | Meurer | 123/30.21 |
| 2,873,727 | 2/1959 | Meurer | 123/32 A |
| 2,907,308 | 10/1959 | Meurer et al. | 123/30.21 |
| 2,921,566 | 1/1960 | Meurer | 123/32 EA |
| 2,942,591 | 1/1960 | Meurer | 123/30 D |
| 3,046,959 | 7/1962 | Meurer | 123/30 D |
| 3,809,031 | 5/1974 | Meurer et al. | 123/30 D |
| 4,006,720 | 2/1977 | Sato et al. | 123/30 D |

*Primary Examiner*—Charles J. Myhre
*Assistant Examiner*—R. A. Nelli
*Attorney, Agent, or Firm*—Becker & Becker, Inc.

[57] ABSTRACT

An air-compressing direct injection internal combustion engine having a combustion chamber in the shape of a body of revolution which combustion chamber at the end of the compression stroke contains nearly the entire necessary amount of combustion air which by suitable means is circulated about the cylinder axis of the respective pertaining cylinder of the engine. In this engine, a substantial portion of the liquid fuel is in the form of a thin film applied to the combustion chamber wall where it is processed so as to be picked up by and intermixed with the combustion air, whereupon the fuel air mixture is burnt. For purposes of facilitating the processing of the above mentioned fuel film and/or the realization of a pre-oxidation of the fuel, and for facilitating the pick-up of the fuel in the direction of the rotation of the air, additional means are provided and arranged in or on the combustion chamber wall and, when viewed in the direction of rotation of the air are located ahead of the fuel film. These additional means are such that the laminary boundary flow over the fuel film will be destroyed while the main flow of the air in the combustion chamber is not or only immaterially affected.

4 Claims, 5 Drawing Figures

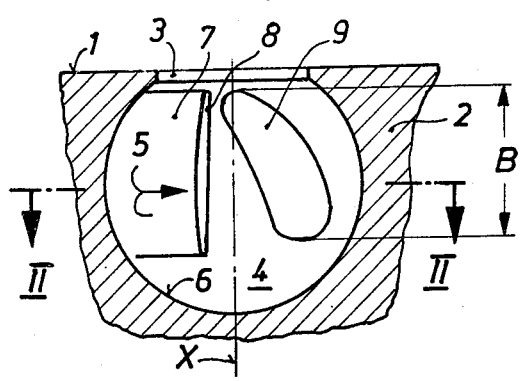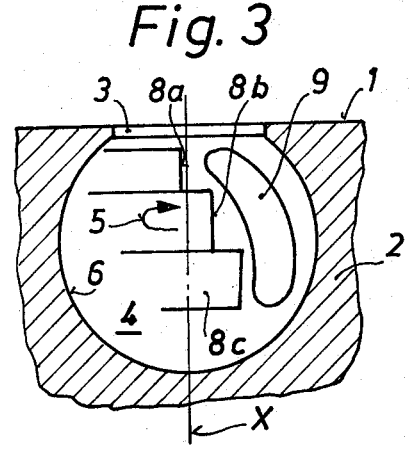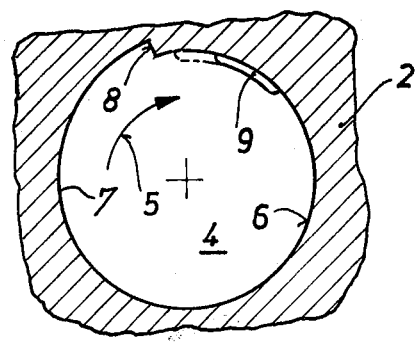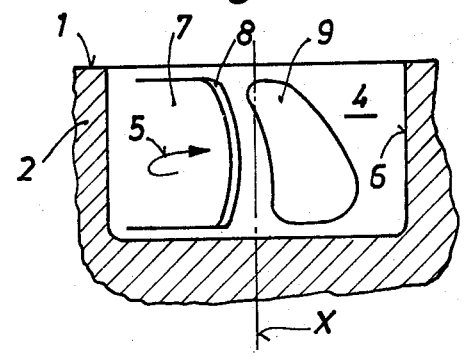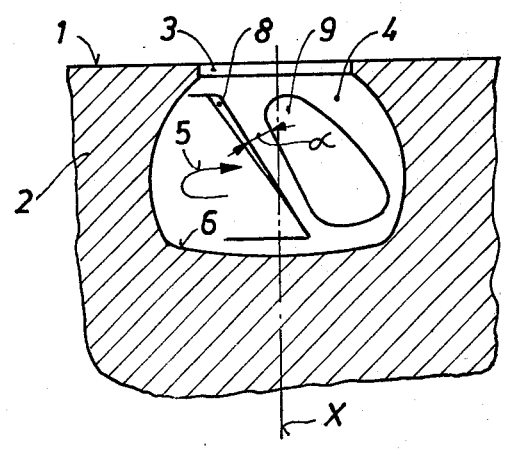

AIR-COMPRESSING DIRECT INJECTION INTERNAL COMBUSTION ENGINE

This is a continuation application of parent Ser. No. 823,136–Buddenhagen, filed Aug. 9, 1977, now abandoned.

This invention relates to an air-compressing direct injection internal combustion engine having a combustion chamber in the shape of a body of revolution which is arranged in the piston or in the cylinder head and is intended at the end of the compression stroke to accept nearly the full amount of combustion air which by suitable means is rotated about the cylinder axis and in which a substantial portion of the liquid fuel is applied as a thin film onto the surface of the combustion chamber where it is processed, removed by the combustion air, mixed and burnt with the latter, and in which the combustion chamber is provided with additional means for improved processing and/or achieving preoxidation of the fuel.

Internal combustion engines of this type which employ the concept of wall application are well known. They offer a number of advantages of which the low exhaust gas discoloration, the favorable fuel consumption, the high specific output and smooth running are particularly worth noting. Since it has already previously been found that these engines are liable, especially after starting or during operating modes where the combustion chamber wall fails to have the temperature necessary for an adequately fast rate of preparation of fuel, to develop white and/or blue smoke which is objectionable and affects visibility and may even be obnoxious to the human organism, efforts have been made to overcome this disadvantage by providing additional means whereby a faster rate of fuel preparation and/or preoxidation is obtained.

For instance, it was proposed according to the DDR Patent Specification No. 96 750 to utilize a longer free fuel jet and behind the impingement of said fuel jet upon the fuel chamber wall to provide a downstep-like discontinuity whereby the fuel film which continues to spread owing to its kinetic energy and the revolving air layers, is caused to separate at least partly and to mix directly with the air. Local turbulence at the discontinuity or step enhances preoxidation of a portion of the fuel.

From German Auslegeschrift No. 1 526 316 it has become known, for achieving a preoxidation of fuel, to provide several downstep discontinuities or steps in the combustion chamber wall which extend transverse to the direction of air flow in the combustion chamber surface in the area of fuel impingement and that part of the combustion chamber surface where the film is formed. As a result, the fuel is made initially to jump from one step to the next, and while thus being preoxidized in the process, then spreads in the form of a film.

While the provision of such additional means has led to an improvement, the success, however, has been only partial. This is because it was frequently found that in the steps or grooves, located in the area of the fuel film in order to make them effective, fuel accumulations occur the combustion of which is delayed more or less according to the local conditions whereby obviously the benefits of the additional means provided are partly or even entirely offset. Added to this is the fact that in the embodiments described it is invariably only a portion of the fuel film which is subjected to preoxidation, namely that portion which exists in the region of the step or steps.

It is, therefore, an object of the present invention to overcome the drawbacks mentioned in an internal combustion engine of the type initially described, i.e. to improve the preparation, removal and combustion of the entire fuel applied film-wise onto the combustion chamber surface without detracting from the advantages inherent in the internal combustion engine.

This object and other objects and advantages of the invention will appear more clearly from the following specification in connection with the accompanying drawing in which:

FIG. 1 is a longitudinal section through the upper part of a piston having a combustion chamber with means according to the invention.

FIG. 2 is a section taken along the line II-II through the piston and combustion chamber shown in FIG. 1.

FIGS. 3 to 5 are different combustion chambers with several variants of the features according to the invention.

The air compressing direct fuel injection internal combustion engine according to the present invention is characterized primarily in that the additional means for improved preparation and removal of the fuel are arranged at a point ahead of the fuel film when viewed in the direction of the air rotation, and more specifically in or on the combustion chamber surface, said additional means being so designed that the laminar boundary flow over the fuel film is destroyed, while the main flow of the air in the combustion chamber is unaffected or nearly unaffected. In other words, the invention provides for a tripping hump discontinuity outside the fuel film, the discontinuity being so designed that the fuel film is uniformly prepared and removed and/or subjected to uniform preoxidation in its entirety, and not only partially as hitherto, especially since no fuel accumulations whatsoever can occur. As a result, a more uniform improved combustion is achieved whereby in particular the concentration of obnoxious emissions in the exhaust gases is substantially reduced. Also it was found that an improvement in engine output was obtained.

According to a further development of the invention it is proposed that the additional means be formed as one or a plurality of steps in the combustion chamber surface rising in a radial direction towards the center of the combustion chamber and extending perpendicular to or substantially perpendicular to the air flow.

The length of the steps should be at least equal to the width of the fuel film so that the destruction of the laminar boundary layer is actually achieved across the entire film. The height and location of the step or steps differ and have to be optimized to match the operating parameters of the engine. Thus, it may be quite advantageous to form a step—viewed in the direction of the air rotation—from a plurality of staggered sections or to form the step arcuately also viewed in the direction of the air rotation. Viewed in a projection relative to the combustion chamber axis, the step may furthermore be arranged at an angle to the axis which is smaller than 70°. The orientation is governed entirely by the shape of the fuel film.

Referring now to the drawing in detail, FIG. 1 shows a spherically shaped combustion chamber 4 with a constricted throat 3 in the crown 1 of a partly drawn piston 2. As soon as the piston 2 has reached its top dead center position, the combustion chamber 4 receives nearly all the combustion air which has imparted to it a fast rotary motion corresponding to the arrow 5 (FIG. 2) about the axis x of the combustion chamber by means not shown in the drawing, such as masked valves, swirlports and similar means. The combustion chamber surface 6, viewed in the direction of air rotation 5, is provided with a recess 7 which gradually increases in a radial direction and which is confined at its end by a step 8 rising radially towards the combustion chamber center and formed as a tripping hump (see in particular FIG. 2). Again viewed in the direction of the air rotation 5 downstream of the step 8 the drawing shows schematically the fuel film 9 having a width B which has been applied to the combustion chamber surface 6 and has already spread to its full extent.

As can best be seen from FIG. 2, the laminar boundary layer of the rotating air is destroyed by the step which results in an improved preparation and removal of the fuel. The main flow is practically unaffected by this step, in other words, mixture formation and combustion processes take place in an orderly manner.

In FIGS. 3 to 5 those parts corresponding to similar parts of FIG. 1 have been designated with the same reference numerals as in FIG. 1. FIG. 3 again shows a spherical combustion chamber whose surface is formed with a step 8 which, viewed in the direction of the air rotation, consists of three staggered sections 8a, 8b and 8c. This is apt to offer an advantage in that control of the laminar flow in the boundary layer can be better matched to the fuel film 9.

For the same reason, the step 8 may, as shown in FIG. 4, be of arcuate shape viewed in the direction of the air rotation. The combustion chamber 4 in this figure is also in the shape of a body of revolution, a cylinder in this specific case.

FIG. 5 finally shows a flat-bottomed combustion chamber 4 in whose combustion chamber wall 6 the step 8, with regard to the projection of the combustion chamber axis 5, extends at an angle relative to the latter.

It is, of course, to be understood that the present invention is, by no means, limited to the specific showing in the drawing but also comprises any modifications within the scope of the appended claims.

Thus, while the invention has been described with the combustion chamber provided in the piston, the combustion chamber may instead also equally well be provided in the cylinder head; in other words, the member 2 instead of representing a portion of a piston may represent a portion of the cylinder head.

What I claim is:

1. In an air-compressing direct injection internal combustion engine having a cylinder with a first member represented by a cylinder head for said cylinder and with a second member represented by a piston reciprocable in said cylinder and having a compression stroke, said members including a combustion chamber including a substantially cylindrical wall and having a center axis extending therethrough which lies in a plane located vertically with respect to the chamber in one of said members and including moving air compressed by the piston in said combustion chamber, the major portion of the cylindrical wall of said combustion chamber resulting from geometric rotation of the plane through approximately 270° about the axis of the chamber, and said combustion chamber having a constricted opening for passage of combustion air and gases moved upon relative movement of said members, said chamber containing substantially all the combustion air and gases at the compression stroke, and also being adapted to form a film of fuel on said wall, said wall having an improvement in combination therewith comprising a discontinuity extending longitudinally along said wall in front of the moving air and at least as long as the length of said film on the wall so that the air moving along said wall strikes said discontinuity, said discontinuity particularly being formed by an arrangement including a step and a segment of said wall having its surface extended radially outward of said cylindrical wall, the step of the arrangement rising radially towards the combustion chamber center axis and including a radial surface formation as a tripping hump extending radially outwardly from said cylindrical wall with a radius increasing in direction of rotation relative to said surface of said segment outwardly of said cylindrical wall, so that the laminar boundary of said moving air is destroyed by said step to result in improved removal of the fuel in said fuel film while the main flow of air is unaffected.

2. An arrangement in combination according to claim 1, in which the step with tripping hump viewed in the direction of the moving air consists of a plurality of sections staggered relative to each other.

3. An arrangement in combination according to claim 1, in which the step with tripping hump has an arcuate shape in the direction of the moving air 4. An arrangement in combination according to claim 1, in which the step with tripping hump when viewed in a projection on the combustion chamber axis is arranged relative to said axis at an angle which is less than 70°.

UNITED STATES PATENT AND TRADEMARK OFFICE
CERTIFICATE OF CORRECTION

PATENT NO. : 4,273,079
DATED : June 16, 1981
INVENTOR(S) : Uwe Buddenhagen

It is certified that error appears in the above—identified patent and that said Letters Patent is hereby corrected as shown below:

On the Title-Abstract page, please correct the same as follows:

[30]     Foreign Application Priority Data

Aug. 10, 1976 [DE]   Fed.Rep.of Germany   26 35 847

Signed and Sealed this

Twenty-second Day of September 1981

[SEAL]

Attest:

GERALD J. MOSSINGHOFF

*Attesting Officer*     *Commissioner of Patents and Trademarks*